United States Patent
Tuji

(10) Patent No.: US 9,315,118 B2
(45) Date of Patent: Apr. 19, 2016

(54) POWER SLIDING APPARATUS OF CONVEYANCE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventor: Eiichirou Tuji, Aichi-ken (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/309,078

(22) Filed: Jun. 19, 2014

(65) Prior Publication Data

US 2014/0374563 A1    Dec. 25, 2014

(30) Foreign Application Priority Data

Jun. 20, 2013    (JP) .................... 2013-129263

(51) Int. Cl.
*B60N 2/06* (2006.01)
*B60N 2/02* (2006.01)

(52) U.S. Cl.
CPC ........... *B60N 2/067* (2013.01); *B60N 2002/024* (2013.01)

(58) Field of Classification Search
CPC ...................... B60N 2/067; B60N 2002/024
USPC ....................... 248/429; 296/65.15
See application file for complete search history.

(56) References Cited

U.S. PATENT DOCUMENTS

| | | | | |
|---|---|---|---|---|
| 4,802,374 | A | * | 2/1989 | Hamelin et al. .............. 74/89.14 |
| 5,150,872 | A | * | 9/1992 | Isomura ......................... 248/429 |
| 5,765,798 | A | * | 6/1998 | Isomura ......................... 248/430 |
| 5,829,727 | A | * | 11/1998 | Chinomi et al. .............. 248/429 |
| 7,556,234 | B2 | * | 7/2009 | Ito et al. ......................... 248/429 |
| 7,658,429 | B2 | * | 2/2010 | Koga et al. ................... 296/65.15 |
| 2006/0226674 | A1 | * | 10/2006 | Ito et al. ..................... 296/65.13 |
| 2008/0238126 | A1 | * | 10/2008 | Koga et al. ................. 296/65.13 |
| 2010/0242650 | A1 | * | 9/2010 | Koga et al. ....................... 74/416 |
| 2011/0278419 | A1 | * | 11/2011 | Sovis ............................. 248/429 |
| 2012/0145868 | A1 | * | 6/2012 | Okada et al. .................. 248/429 |
| 2015/0090856 | A1 | * | 4/2015 | Morishita et al. ............. 248/429 |

FOREIGN PATENT DOCUMENTS

| | | |
|---|---|---|
| CN | 1843803 | 10/2006 |
| CN | 101659222 | 3/2010 |
| CN | 101987584 | 3/2011 |
| CN | 202063035 | 12/2011 |
| JP | 2006-290131 | 10/2006 |
| WO | 2012/005416 | 1/2012 |

OTHER PUBLICATIONS

Official Action, with partial English-language translation thereof, for CN Pat. App. No. 201410280886 having an issuance date of Jan. 29, 2016.

* cited by examiner

*Primary Examiner* — Anita M King
(74) *Attorney, Agent, or Firm* — Greenblum & Bernstein, P.L.C.

(57) ABSTRACT

In right and left upper rails in a power sliding apparatus of a conveyance seat, openings to receive gear boxes are formed, respectively. The gear boxes are attached to the right and left upper rails via the openings, respectively. The opening in one of the right and left upper rails is closed with a motor fixing bracket to fix a motor unit.

7 Claims, 4 Drawing Sheets

US 9,315,118 B2

POWER SLIDING APPARATUS OF CONVEYANCE SEAT

INCORPORATION BY REFERENCE

The disclosure of Japanese Patent Application No. 2013-129263 filed on Jun. 20, 2013 including the specification, drawings and abstract is incorporated herein by reference in its entirety.

BACKGROUND OF THE INVENTION

1. Field of the Invention

The invention relates to a power sliding apparatus of a conveyance seat.

2. Description of Related Art

Heretofore, as this type of power sliding apparatus, a technology disclosed in, for example, Japanese Patent Application Publication No. 2006-290131 (JP 2006-290131 A) has already been known. In this technology, ball screws are rotatably attached to upper rails, and ball nuts to be engaged with the ball screws are attached to lower rails. When the ball screws are rotated by a rotational force of a motor, the upper rails are slid to the lower rails. In consequence, a conveyance seat is electrically slidable even by a simple constitution.

However, in the abovementioned technology of JP 2006-290131 A, gear boxes to transmit the rotational force of the motor to the ball screws are attached to the upper rails via openings formed in the upper surfaces of the upper rails. In such attaching, the upper rail is bent substantially into a V-shape at the opening by a load applied to an anchor bracket from a sitting person via a seat belt due to an occurrence of frontal collision of the vehicle. To prevent this upper rail from being bent, the opening of the upper rail is closed with a reinforcing bracket (a bracket in JP 2006-290131 A). On the other hand, the motor is fixed to, for example, the upper rail or a cushion frame via a motor fixing bracket (not shown in JP 2006-290131 A). Therefore, the two brackets of the reinforcing bracket and the motor fixing bracket are required for this opening and the vicinity of the opening, which has been required to be simplified.

SUMMARY OF THE INVENTION

According to the invention, there is provided a power sliding apparatus of a conveyance seat which does not require two brackets, i.e., a reinforcing bracket which closes an opening formed in an upper rail to be attached to gear box to transmit a rotational force of a motor to a ball screw or a ball nut, and a motor fixing bracket which fixes the motor.

According to an aspect of the invention, a power sliding apparatus of a conveyance seat includes right and left upper rails; right and left lower rails; a motor unit which is fixed to one of the right and left upper rails; a motor fixing bracket to fix the motor unit to the one upper rail; and transmission shafts and gear boxes to transmit a rotational force of the motor to ball screws or ball nuts attached to the lower rails or the upper rails. When the rotational force of a motor constituting the motor unit is transmitted to the ball screws or the ball nuts, the right and left upper rails slide relatively to the right and left lower rails. In the right and left upper rails, openings to receive the gear boxes are formed, respectively. The gear boxes are attached to the right and left upper rails via the openings, respectively. The opening in one of the right and left upper rails is closed with the motor fixing bracket. According to this constitution, the motor fixing bracket has both of a function of fixing the motor unit and a function of closing the opening in one of the right and left upper rails. Therefore, as described in the related art, a reinforcing bracket to cover this opening (a bracket in JP 2006-290131 A) is not required. As a result, the motor fixing bracket only satisfies the required functions, and hence two brackets (the reinforcing bracket and the motor fixing bracket) are not required.

Furthermore, according to the above aspect of the invention, the power sliding apparatus of the conveyance seat may further include a reinforcing bracket which closes the opening in the other upper rail. The motor fixing bracket may be fastened to the reinforcing bracket. According to this constitution, for example, when the motor fixing bracket is coupled to the reinforcing bracket, another bracket is not required, and hence it is possible to decrease the number of parts (decrease the number of the parts from three to two).

Furthermore, in the power sliding apparatus of the conveyance seat according to the above aspect of the invention, the motor fixing bracket may be integrally formed with the reinforcing bracket to also serve as the reinforcing bracket. This constitution does not require the reinforcing bracket and the bracket which couples the motor fixing bracket to the reinforcing bracket, and hence it is possible to decrease the number of the parts (decrease the number of the parts from three to one).

Furthermore, in the power sliding apparatus of the conveyance seat according to the above aspect of the invention, the motor unit is fixed to the motor fixing bracket via an attaching bracket secured to the motor itself, and an edge of the attaching bracket may be attached to the motor fixing bracket by bending attaching pieces formed in the motor fixing bracket. According to this constitution, it is possible to easily perform this attaching as compared with the attaching by screws or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the present invention will be described with reference to the drawings. First, Embodiment 1 of the present invention will be described with reference to FIGS. 1 and 2. In the following description, as an example of "a conveyance seat", "a passenger seat 1 for an automobile (hereinafter referred to simply as "the passenger seat 1")" will be described. In the present embodiment, the passenger seat 1 is disposed on the left side of a driver's seat. Furthermore, in the following description, up, down, front, rear, right and left indicate up, down, front, rear, right and left directions described in the abovementioned drawings, i.e., the up, down, front, rear, right and left directions when the passenger seat 1 disposed in the car (not shown) is a reference. This also applies to the after-mentioned embodiments 2 and 3.

First, a constitution of the passenger seat 1 is described. The passenger seat 1 is constituted of, for example, a seat cushion and a seat back (both are not shown). Furthermore, the passenger seat 1 includes a power sliding apparatus 10 so that the seat cushion is electrically slidable backward and forward.

Figure 1:
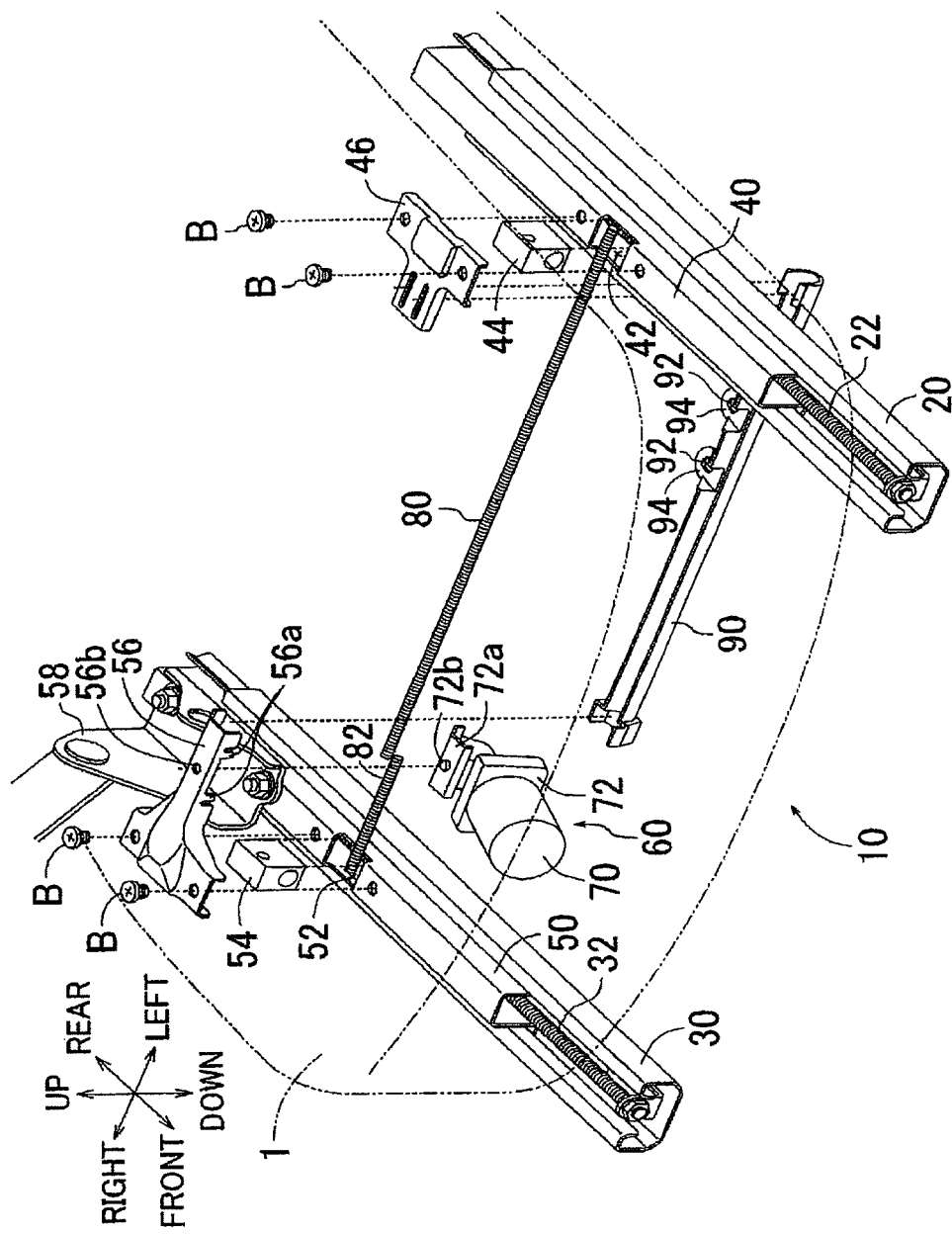
FIG. 1 is an exploded perspective view of a part of a power sliding apparatus of a passenger seat according to Embodiment 1 of the present invention.
Figure 2:
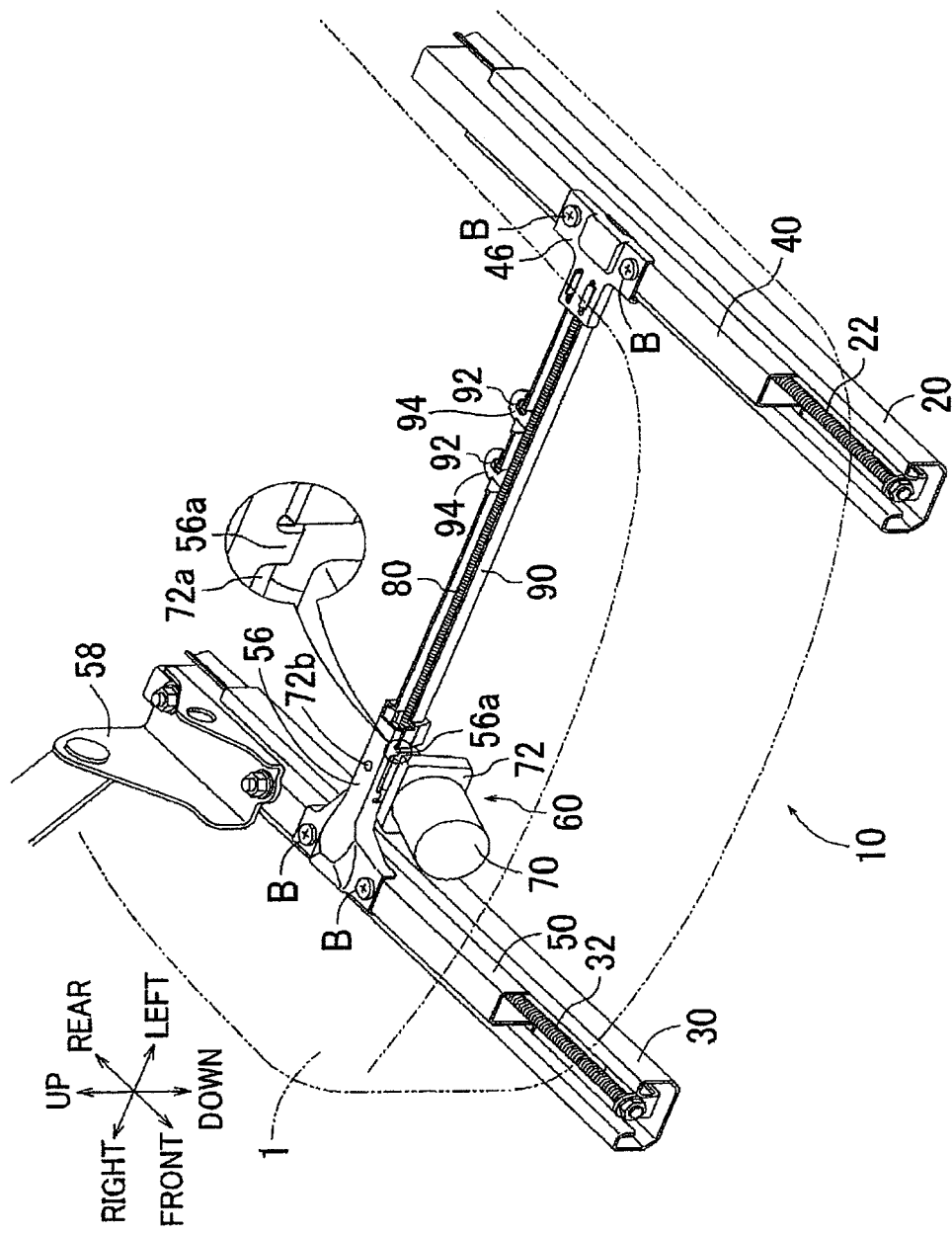
FIG. 2 is a perspective view showing an attached state of FIG. 1.

As shown in FIGS. 1 and 2, the power sliding apparatus 10 is mainly constituted of right and left lower rails 30 and 20, right and left upper rails 50 and 40, and a drive mechanism 60. Hereinafter, the right and left lower rails 30 and 20, the right and left upper rails 50 and 40 and the drive mechanism 60 will individually be described.

First, the right and left lower rails 30 and 20 are described. The right and left lower rails 30 and 20 are formed into a longitudinal shape extending in a forward-backward direction of the car. In the right and left lower rails 30 and 20, ball screws 32 and 22 are attached along a longitudinal direction, respectively. It is to be noted that the right and left lower rails 30 and 20 are formed to constitute a pair of right and left rails.

Next, the right and left upper rails 50 and 40 will be described. The right and left upper rails 50 and 40 are also formed into a longitudinal shape extending in the forward-backward direction of the car in the same manner as in the right and left lower rails 30 and 20. Furthermore, the right and left upper rails 50 and 40 are formed to be slidable along the longitudinal direction to the right and left lower rails 30 and 20. In the right and left upper rails 50 and 40, gear boxes 54 and 44 having ball nuts (not shown) to be engaged with the ball screws 32 and 22 are attached, respectively.

In the gear box 44, a worm wheel (not shown) is disposed so that the ball nut (not shown) rotates when a left transmission shaft 80 is rotated. This also applies to the gear box 54.

The gear boxes 54 and 44 are attached to the right and left upper rails 50 and 40 via openings 52 and 42 formed in upper surfaces of the right and left upper rails, respectively. On the upper surfaces of the right and left upper rails 50 and 40, a motor fixing bracket 56 and a reinforcing bracket 46 are fastened with screws B, B to cover the openings 52 and 42. The reinforcing bracket 46 and the motor fixing bracket 56 are substantially formed into a T-shape, and face each other in a car width direction. The reinforcing bracket 46 and the motor fixing bracket 56 are similar to reinforcing brackets (brackets in JP 2006-290131 A) described in the related art, and are formed, for example, by bending formation in which metal members are bent with a press.

When the opening 52 is covered with the motor fixing bracket 56 in this manner, it is possible to prevent the right upper rail 50 from being substantially bent at the opening 52 into a V-shape by a load applied to an after-mentioned anchor bracket 58 from a sitting person via a seat belt (not shown) due to an occurrence of frontal collision of the car. Furthermore, the reinforcing bracket 46 and the motor fixing bracket 56 are coupled to a coupling bracket 90 which couples the reinforcing bracket 46 to the motor fixing bracket 56. In both end portions of the coupling bracket 90, attaching portions each substantially having a U-shaped cross section are disposed. Both free ends of the substantial U-shape of each of the attaching portions of the coupling bracket 90 are dented so that the portions are fitted into the reinforcing bracket 46 and the motor fixing bracket 56, respectively, and the coupling bracket 90 is coupled to the reinforcing bracket 46 and the motor fixing bracket 56 by a reaction force of a deflection generated by this fitting.

The coupling bracket 90 is made of a resin and substantially formed so that a transverse cross section thereof substantially forms such a U-shape as to cover lower sides of a right transmission shaft 82 and the left transmission shaft 80. In consequence, it is possible to prevent interference of foreign materials with the right and left transmission shafts 82 and 80. Furthermore, in the coupling bracket 90, clip attaching washers 94 each having a clip hole 92 are formed. Therefore, it is possible to attach belt clips (both are not shown) each of which is wound with a wire harness. Therefore, it is possible to finely handle the wire harness disposed under the passenger seat 1.

Furthermore, on a rear side of the right upper rail 50, the anchor bracket 58 of a buckle (not shown) of a seat belt device is attached. It is to be noted that the right and left upper rails 50 and 40 are formed to constitute a pair of right and left rails.

Finally, the drive mechanism 60 is described. The drive mechanism 60 is constituted of a motor 70, a decelerator unit 72 mechanically coupled to a rotary shaft (not shown) of the motor 70, and the right and left transmission shafts 82 and 80 mechanically coupled to the decelerator unit 72 and attached to couple the right and left upper rails. It is clearly shown in FIG. 1 that the motor 70 is fastened integrally to the decelerator unit 72. In the embodiment, the motor and the decelerator unit 72 constitutes a motor unit.

Furthermore, the decelerator unit 72 fastened to the motor 70 is fastened to a tip of a long side of the substantial T-shape in the motor fixing bracket 56 by caulking. This fastening is described in detail. At the tip of the long side of the substantial T-shape of the motor fixing bracket 56, four inwardly bendable attaching pieces 56a are formed. Furthermore, at this tip, there is formed a positioning hole 56b into which a positioning pin 72b of the after-mentioned decelerator unit 72 is to be inserted.

On the other hand, in the decelerator unit 72, an attaching bracket 72a is formed. In the attaching bracket 72a, the positioning pin 72b is formed. Therefore, when the decelerator unit 72 is fastened to the motor fixing bracket 56, the four attaching pieces 56a are bent inwardly in a state where the positioning pin 72b is inserted into the positioning hole 56b. In consequence, the decelerator unit 72 is fastened to the motor fixing bracket 56 by the caulking. At this time, the positioning pin 72b is inserted into the positioning hole 56b, and hence it is possible to enhance an accuracy of this fastening position Furthermore, the left transmission shaft 80 is mechanically coupled to the decelerator unit 72 and the gear box 44. On the other hand, the right transmission shaft 82 is also mechanically coupled to the decelerator unit 72 and the gear box 54. The right and left lower rails 30 and 20, the right and left upper rails 50 and 40 and the drive mechanism 60 constitute the power sliding apparatus 10.

Finally, an operation of the power sliding apparatus 10 is described. When the motor 70 is driven, a rotational force of the motor is transmitted to both the ball nuts (not shown) via the decelerator unit 72, the right and left transmission shafts 82 and 80, and both the worm wheels (not shown) in the gear boxes 54 and 44. In consequence, both the ball nuts (not shown) move in an axial direction of the ball screws 22 and 32 while rotating, and eventually, the right and left upper rails 50 and 40 electrically slide to the right and left lower rails 30 and 20. It is to be noted that when a rotating direction of the motor 70 is reversed, a rotating direction of each ball nut is also reversed, so that a sliding direction of the right and left upper rails 50 and 40 is also reversed.

The power sliding apparatus 10 according to Embodiment 1 of the present invention is constituted as described above.

According to this constitution, on the upper surface of the right upper rail 50, the motor fixing bracket 56 substantially formed into the T-shape to cover the opening 52 is fastened via the screws B, B. Furthermore, the tip of the long side of the substantial T-shape in the motor fixing bracket 56 is fastened to the decelerator unit 72 fastened to the motor 70 by the caulking. According to such a constitution, the motor fixing bracket 56 has both of a function of fixing the motor 70 and a function of covering the opening 52 of the right upper rail 50. Therefore, a reinforcing bracket to cover the opening 52 (the bracket in JP 2006-290131 A) as described in the related art is not required. As a result, the motor fixing bracket 56 only satisfies the required functions, and hence two brackets (the reinforcing bracket and the motor fixing bracket 56) are not required.

Furthermore, according to this constitution, the decelerator unit 72 is fastened to the motor fixing bracket 56 by the caulking. Therefore, it is possible to easily perform the fastening as compared with the fastening by, for example, screws or the like.

Next, Embodiment 2 of the present invention will be described with reference to FIG. 3. It is to be noted that in the following description, the same members as the members described in Embodiment 1 are denoted with the same reference numerals in the drawing, so that redundant description is omitted. This also applies to an after-mentioned embodiment 3.

Figure 3:
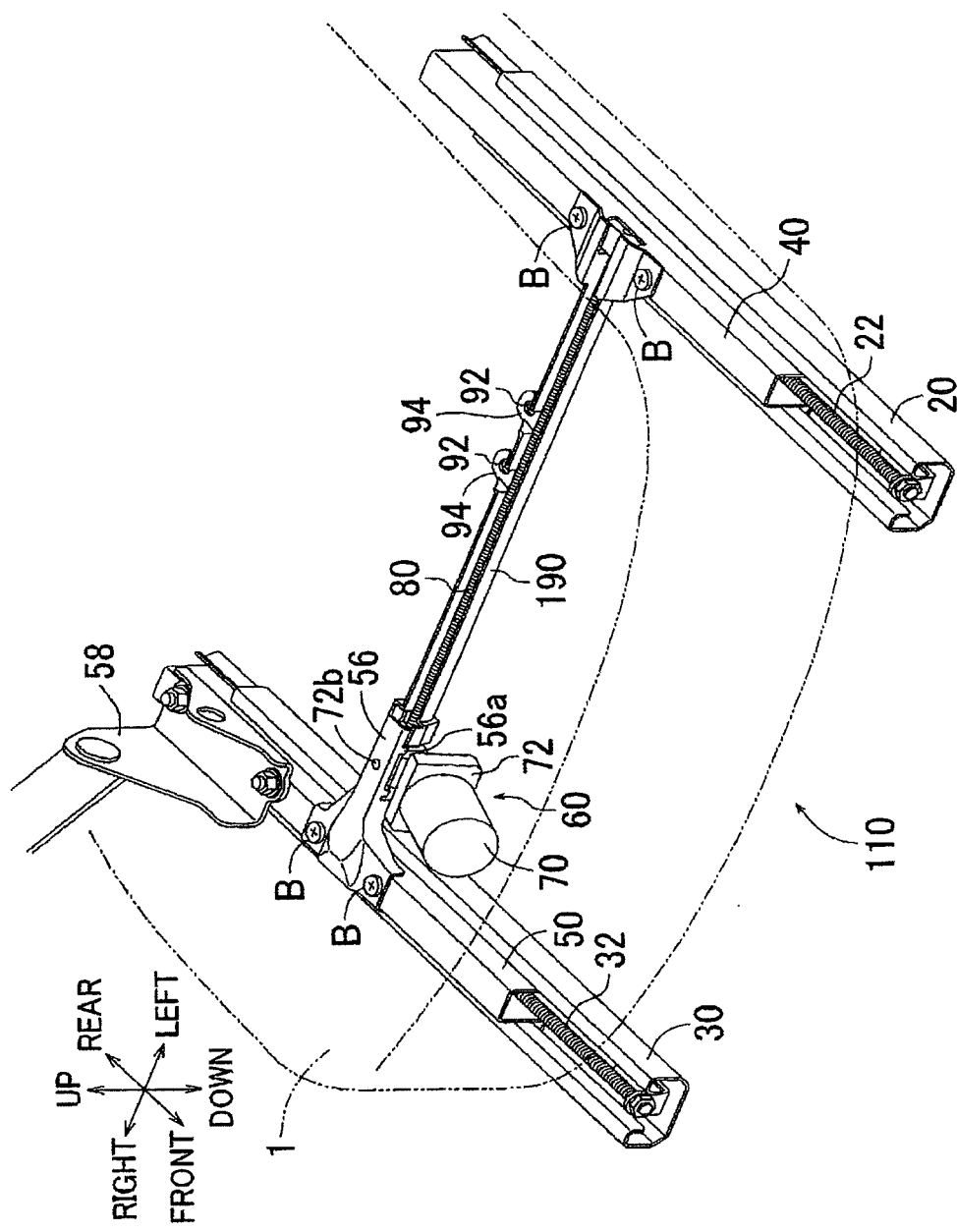
FIG. 3 is a perspective view of a power sliding apparatus of a passenger seat according to Embodiment 2 of the present invention.

As shown in FIG. 3, in a power sliding apparatus 110 of Embodiment 2, a reinforcing bracket 46 to cover an opening of a left upper rail 40 is also made of a resin as compared with the power sliding apparatus 10 of Embodiment 1 already described. Therefore, in Embodiment 2, a bracket having functions of the reinforcing bracket 46 and the coupling bracket 90 in Embodiment 1 is made of a resin to integrally constitute a coupling bracket 190.

According to this constitution, it is possible to obtain a function and an effect similar to those of the power sliding apparatus 10 of Embodiment 1. Furthermore, according to this constitution, the reinforcing bracket 46 and the coupling bracket 90 described in Embodiment 1 integrally constitute the coupling bracket 190, and hence as compared with Embodiment 1, it is possible to decrease the number of parts (decrease the number of the parts from two to one).

Figure 4:
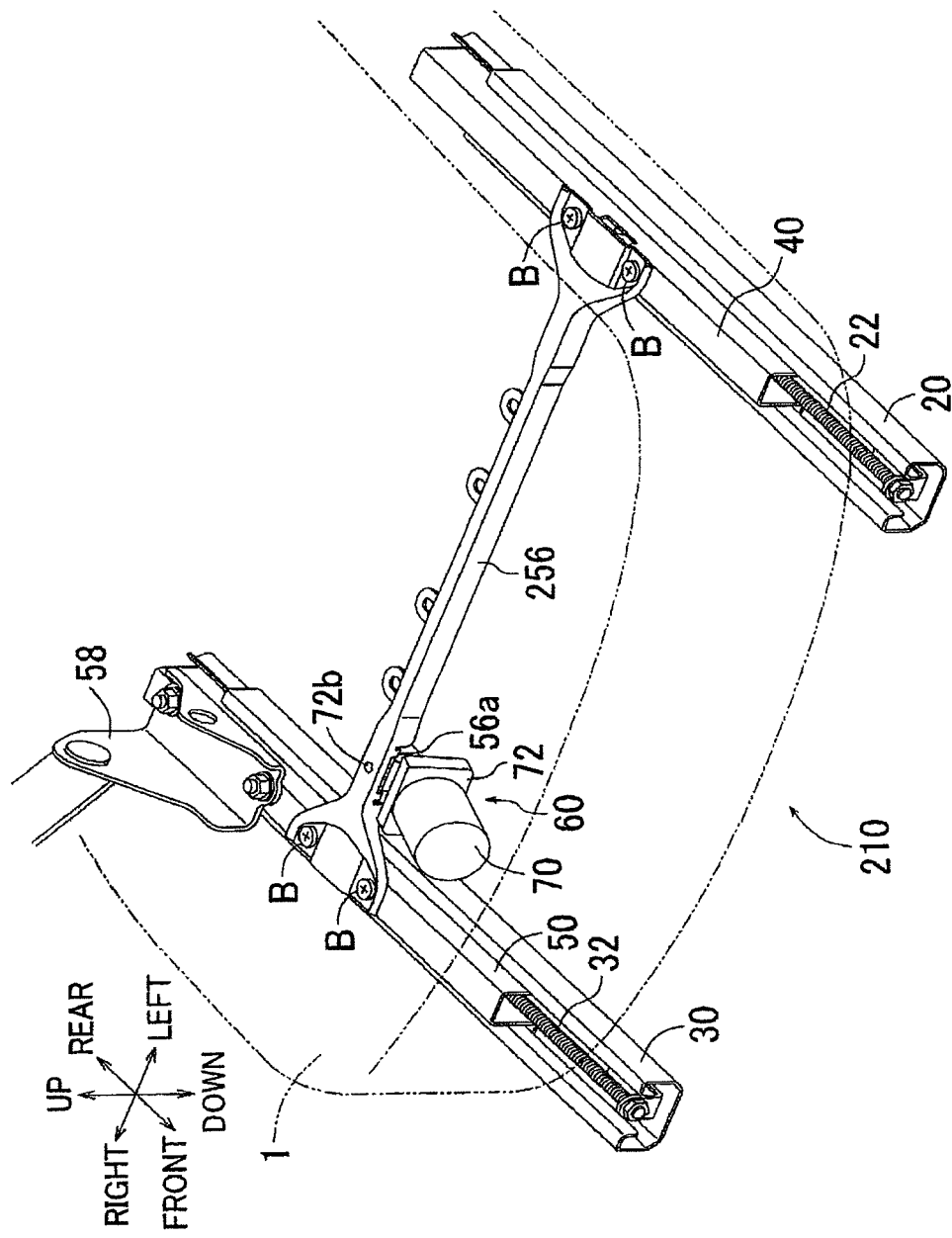
FIG. 4 is a perspective view of a power sliding apparatus of a passenger seat according to Embodiment 3 of the present invention.

Next, Embodiment 3 of the present invention will be described with reference to FIG. 4. As shown in FIG. 4, in a power sliding apparatus 210 of Embodiment 3, a coupling bracket 90 is also made of a metal as compared with the power sliding apparatus 10 of Embodiment 1 already described. Therefore, in Embodiment 3, a bracket having functions of the reinforcing bracket 46, the motor fixing bracket 56 and the coupling bracket 90 in Embodiment 1 is made of the metal to integrally constitute a motor fixing bracket 256.

According to this constitution, it is possible to obtain a function and an effect similar to those of the power sliding apparatus 10 of Embodiment 1. Furthermore, according to this constitution, the reinforcing bracket 46, the motor fixing bracket 56 and the coupling bracket 90 described in Embodiment 1 integrally constitute the motor fixing bracket 256, and hence as compared with Embodiment 1, it is possible to decrease the number of parts (decrease the number of the parts from three to one).

The abovementioned contents persistently relate to the embodiments of the present invention, and it is not meant that the present invention is limited to the above contents. In the respective embodiments, as the example of "the conveyance seat", "the passenger seat 1" is described. However, the present invention is not limited to this example, and "the conveyance seat" may be a seat for each type of vehicle, for example, "a seat for a boat and a ship", "a seat for a plane" or "a seat for a railway vehicle".

Furthermore, in the respective embodiments, it has been described that the motor 70 is driven to rotate both the ball nuts (not shown), thereby sliding the right and left upper rails 50 and 40. However, the present invention is not limited to this configuration, and the motor 70 may be driven to rotate both the ball screws 32 and 22, thereby sliding the right and left upper rails 50 and 40. Needless to say, similarly to the related art, the ball screws 32 and 22 may be attached to the right and left upper rails 50 and 40, and the ball nuts (not shown) may be attached to the right and left lower rails 30 and 20.

Furthermore, in Embodiments 1 and 2, it has been described that the decelerator unit 72 is fastened to the motor fixing bracket 56 by the caulking. However, the present invention is not limited to this configuration, and the decelerator unit 72 may be fastened to the motor fixing bracket 56 by screws.

What is claimed is:

1. A power sliding apparatus of a conveyance seat comprising:
   right and left upper rails, each upper rail including an opening;
   right and left lower rails;
   a motor unit which is fixed to one of the right and left upper rails;
   a motor fixing bracket to fix the motor unit to the one upper rail; and
   transmission shafts and gear boxes to transmit a rotational force of a motor of the motor unit to one of ball screws and ball nuts attached to at least one of the lower rails and the upper rails, wherein
   when the rotational force of the motor is transmitted to the one of the ball screws and the ball nuts, the right and left upper rails slide relatively to the right and left lower rails,
   the gear boxes are received in and attached to the right and left upper rails via the openings, respectively,
   the opening in the one upper rail is closed by the motor fixing bracket, and
   the gear box of the one upper rail is attached via the opening of the one upper rail at a position below a face of the motor fixing bracket that closes the opening of the one upper rail.

2. The power sliding apparatus of the conveyance seat according to claim 1, further comprising:
   a reinforcing bracket which closes the opening in the other upper rail,
   wherein the motor fixing bracket is fastened to the reinforcing bracket.

3. The power sliding apparatus of the conveyance seat according to claim 2,
   wherein the motor fixing bracket is integral with the reinforcing bracket to serve as the reinforcing bracket.

4. The power sliding apparatus of the conveyance seat according to claim 1,
   wherein the motor unit is fixed to the motor fixing bracket via an attaching bracket secured to the motor, and
   an edge of the attaching bracket is attached to the motor fixing bracket by bent attaching pieces of the motor fixing bracket.

5. The power sliding apparatus of the conveyance seat according to claim 1,
   wherein the motor fixing bracket closes the opening of the one upper rail by covering a plane spanning the opening of the one upper rail.

6. The power sliding apparatus of the conveyance seat according to claim 5,
    wherein the plane is defined by a top surface of the one upper rail.

7. The power sliding apparatus of the conveyance seat according to claim 1,
    wherein a lower surface of the motor fixing bracket faces the one upper rail to close the opening of the one upper rail.

\* \* \* \* \*